US008035062B2

(12) United States Patent
McFadden et al.

(10) Patent No.: US 8,035,062 B2
(45) Date of Patent: Oct. 11, 2011

(54) COMBINATION SPEED COOKING OVEN (75) Inventors: David H. McFadden, Lexington, MA (US); David A. Bolton, Southlake, TX (US)

(73) Assignee: Turbochef Technologies, Inc., Atlanta, GA (US)

( * ) Notice: Subject to any disclaimer, the term of this patent is extended or adjusted under 35 U.S.C. 154(b) by 713 days.

(21) Appl. No.: 11/928,037

(22) Filed: Oct. 30, 2007

(65) Prior Publication Data
US 2008/0296284 A1 Dec. 4, 2008

Related U.S. Application Data (63) Continuation-in-part of application No. 11/098,280, filed on Apr. 4, 2005, now Pat. No. 7,360,533, and a continuation-in-part of application No. 10/614,268, filed on Jul. 7, 2003, and a continuation-in-part of application No. 10/614,532, filed on Jul. 7, 2003, and a continuation-in-part of application No. 11/392,050, filed on Mar. 29, 2006.

(51) Int. Cl.
*A21B 1/22* (2006.01)
*F24C 3/02* (2006.01)
(52) U.S. Cl. ........ 219/400; 219/398; 219/399; 219/405; 219/391; 126/273 R; 126/19 R; 126/21 R; 126/21 A; 99/474; 99/475
(58) Field of Classification Search ............... 219/391, 219/398–400, 405; 99/474–475; 126/273 R, 126/19 R, 21 R, 21 A
See application file for complete search history.

(56) References Cited

U.S. PATENT DOCUMENTS

| | | | |
|---|---|---|---|
| 2,563,253 | A | 8/1951 | Levin |
| 2,704,802 | A | 3/1955 | Blass et al. |
| 3,210,511 | A | 10/1965 | Smith |
| 3,548,152 | A | 12/1970 | Klepzig |
| 3,581,038 | A | 5/1971 | Williams |
| 3,813,216 | A | 5/1974 | Baur et al. |
| 3,828,760 | A | 8/1974 | Farber et al. |
| 3,973,551 | A | 8/1976 | Caselani et al. |
| 3,991,737 | A | 11/1976 | Del Fabbro |
| 4,001,451 | A | 1/1977 | Veeneman et al. |
| 4,154,861 | A | 5/1979 | Smith |
| 4,160,144 | A | 7/1979 | Kashyap et al. |
| 4,160,145 | A | 7/1979 | Rueggeberg |

(Continued)

FOREIGN PATENT DOCUMENTS

CN 2348616 11/1999

(Continued)

OTHER PUBLICATIONS

International Search Report and Written Opinion dated Feb. 11, 2009 in related Application No. PCT/US2008/081689.

(Continued)

*Primary Examiner* — Shawntina Fuqua
(74) *Attorney, Agent, or Firm* — Dean W. Russell; Kristin M. Crall; Kilpatrick Townsend & Stockton LLP (57) ABSTRACT A combination cooking oven is disclosed comprising a cooking cavity, a controller, thermal heating source, blower assembly, air directing means, deflecting means and a vent assembly wherein speed cooking or slower cooking of food products may be accomplished within the same appliance by movement of a gas baffle.

11 Claims, 3 Drawing Sheets

U.S. PATENT DOCUMENTS

| | | | |
|---|---|---|---|
| 4,283,614 A | 8/1981 | Tanaka et al. | |
| 4,316,069 A | 2/1982 | Fitzmayer | |
| 4,327,279 A | 4/1982 | Guibert | |
| 4,337,384 A | 6/1982 | Tanaka et al. | |
| 4,338,911 A | 7/1982 | Smith | |
| 4,350,504 A | 9/1982 | Diachuk | |
| 4,354,083 A | 10/1982 | Staats | |
| 4,403,128 A | 9/1983 | Takagi et al. | |
| 4,409,453 A | 10/1983 | Smith | |
| 4,431,889 A | 2/1984 | Saponara et al. | |
| 4,455,924 A | 6/1984 | Wenzel | |
| 4,464,554 A | 8/1984 | Bakanowski et al. | |
| 4,480,164 A | 10/1984 | Dills | |
| 4,494,525 A | 1/1985 | Albertsen | |
| 4,516,012 A | 5/1985 | Smith et al. | |
| 4,737,373 A | 4/1988 | Forney | |
| 4,752,268 A | 6/1988 | Kataoka et al. | |
| 4,786,774 A | 11/1988 | Kaminaka | |
| 4,849,597 A | 7/1989 | Waigand | |
| 4,924,763 A | 5/1990 | Bingham | |
| 4,949,629 A | 8/1990 | Leary et al. | |
| 4,958,412 A | 9/1990 | Stanek | |
| 4,965,435 A | 10/1990 | Smith et al. | |
| 5,025,775 A | 6/1991 | Crisp | |
| 5,147,994 A | 9/1992 | Smith et al. | |
| 5,161,889 A | 11/1992 | Smith et al. | |
| 5,166,487 A | 11/1992 | Hurley et al. | |
| 5,204,503 A | 4/1993 | Maiellano et al. | |
| 5,277,105 A | 1/1994 | Bruno | |
| 5,369,250 A | 11/1994 | Meredith | |
| 5,401,940 A | 3/1995 | Smith et al. | |
| 5,555,795 A | 9/1996 | Tsai | |
| 5,676,870 A | 10/1997 | Wassman et al. | |
| 5,717,192 A | 2/1998 | Dobie et al. | |
| 5,825,000 A | 10/1998 | Jun | |
| 5,826,496 A | 10/1998 | Jara | |
| 5,927,265 A | 7/1999 | McKee et al. | |
| 5,934,178 A | 8/1999 | Caridis et al. | |
| 5,994,672 A | 11/1999 | Mestnik | |
| 6,012,442 A | 1/2000 | Faraj | |
| 6,058,924 A | 5/2000 | Pool et al. | |
| 6,060,701 A | 5/2000 | McKee et al. | |
| 6,114,664 A | 9/2000 | Cook et al. | |
| 6,250,296 B1 | 6/2001 | Norris et al. | |
| 6,369,360 B1 | 4/2002 | Cook | |
| 6,376,817 B1 | 4/2002 | McFadden | |
| 6,399,930 B2 | 6/2002 | Day et al. | |
| 6,403,937 B1 | 6/2002 | Day et al. | |
| 6,437,303 B1 | 8/2002 | Dorr et al. | |
| 6,472,640 B2 | 10/2002 | Brown et al. | |
| 6,472,647 B2 | 10/2002 | Lee et al. | |
| 6,481,999 B2 | 11/2002 | Knost | |
| 6,655,373 B1 | 12/2003 | Wiker | |
| 6,712,063 B1 | 3/2004 | Thorneywork | |
| 6,713,741 B2 | 3/2004 | Miller | |
| 6,854,456 B1 * | 2/2005 | Friedrich et al. | 126/21 A |
| 6,874,495 B2 | 4/2005 | McFadden | |
| 6,909,078 B2 | 6/2005 | Lee et al. | |
| 7,055,518 B2 | 6/2006 | McFadden | |
| 7,087,872 B1 | 8/2006 | Dobie et al. | |
| 7,360,533 B2 | 4/2008 | McFadden | |
| 7,424,848 B2 | 9/2008 | Jones | |
| 7,507,938 B2 | 3/2009 | McFadden | |
| 7,836,874 B2 | 11/2010 | McFadden | |
| 7,836,875 B2 | 11/2010 | McFadden et al. | |
| 2001/0054605 A1 | 12/2001 | Suzuki et al. | |
| 2002/0023911 A1 | 2/2002 | Bales et al. | |
| 2002/0179588 A1 | 12/2002 | Lubrina et al. | |
| 2003/0226452 A1 | 12/2003 | Artt | |
| 2004/0118392 A1 | 6/2004 | McFadden | |
| 2004/0123858 A1 | 7/2004 | McFadden | |
| 2004/0200828 A1 | 10/2004 | Becker et al. | |
| 2004/0211765 A1 | 10/2004 | McFadden | |
| 2004/0216732 A1 | 11/2004 | McFadden | |
| 2005/0039613 A1 | 2/2005 | Kaminaka et al. | |
| 2005/0211775 A1 | 9/2005 | Vaseloff et al. | |
| 2005/0217503 A1 | 10/2005 | McFadden | |
| 2006/0169272 A1 | 8/2006 | McFadden et al. | |
| 2007/0137633 A1 | 6/2007 | McFadden | |
| 2007/0194011 A1 | 8/2007 | McFadden | |
| 2007/0295322 A1 | 12/2007 | Dobie et al. | |
| 2008/0099008 A1 | 5/2008 | Bolton et al. | |
| 2008/0105133 A1 | 5/2008 | McFadden et al. | |
| 2008/0105135 A1 | 5/2008 | McFadden et al. | |
| 2008/0105136 A1 | 5/2008 | McFadden | |
| 2008/0105249 A1 | 5/2008 | McFadden et al. | |
| 2008/0106483 A1 | 5/2008 | McFadden et al. | |
| 2008/0206420 A1 | 8/2008 | McFadden | |
| 2008/0216812 A1 | 9/2008 | Dougherty | |

FOREIGN PATENT DOCUMENTS

| | | |
|---|---|---|
| DE | 2557867 | 6/1977 |
| DE | 3119596 A1 | 12/1982 |
| DE | 8801849 U1 | 3/1988 |
| DE | 3734958 A1 | 4/1989 |
| EP | 0 096 159 | 12/1983 |
| EP | 0429822 | 6/1991 |
| EP | 0429822 A1 | 6/1991 |
| EP | 0534787 A1 | 3/1993 |
| GB | 2043237 | 10/1980 |
| GB | 2043237 A | 10/1980 |
| JP | 62218736 A | 9/1987 |
| JP | 63-317068 | 12/1988 |
| JP | 2000254001 | 9/2000 |
| WO | WO 9836619 | 8/1998 |
| WO | WO 2004/014139 | 2/2004 |
| WO | WO 2004014139 | 2/2004 |
| WO | WO 2005/041672 | 5/2005 |
| WO | WO 2005/087009 | 9/2005 |
| WO | WO 2006/041814 | 4/2006 |
| WO | WO 2006/081202 | 8/2006 |
| WO | WO 2006/099394 | 9/2006 |
| WO | WO2009058934 | 5/2009 |

OTHER PUBLICATIONS

Rueggeberg, 'A Multislotted Waveguide Antenna for High-Powered Microwave Heating Systems,' IEEE Transactions on Industry Applications, 1A-16(6):809-813 (1980).
Supplementary Search Report dated Mar. 4, 2009 in related European Application No. 04816933.
Response dated Dec. 17, 2008 in related U.S. Appl. No. 10/591,074.
Response dated Jan. 16, 2009 in related U.S. Appl. No. 11/392,050.
Response dated Jan. 16, 2009 in related U.S. Appl. No. 10/614,532.
Office Action dated Feb. 5, 2009 in related U.S. Appl. No. 11/928,063.
Response dated Nov. 13, 2008 in related U.S. Appl. No. 11/663,253.
Office Action dated Mar. 18, 2009 in related U.S. Appl. No. 11/663,253.
Response dated Jan. 23, 2009 in related U.S. Appl. No. 10/614,268.
U.S. Appl. No. 11/908,169, filed Sep. 10, 2007, McFadden.
U.S. Appl. No. 12/045,063, filed Mar. 10, 2008, Dougherty.
Office Action dated Apr. 14, 2009 in related U.S. Appl. No. 10/614,532.
Response dated Jul. 7, 2009 in related U.S. Appl. No. 10/614,532.
Office Action dated Apr. 28, 2009 in related U.S. Appl. No. 10/614,268.
Response dated Jul. 7, 2009 in related U.S. Appl. No. 10/614,268.
Office Action dated Apr. 15, 2009 in related U.S. Appl. No. 11/392,050.
Response dated Jul. 7, 2009 in related U.S. Appl. No. 11/392,050.
Office Action dated Apr. 15, 2009 in related U.S. Appl. No. 10/591,074.
Abstract JP2000254001 published Mar. 8, 1999.
Office Action dated Oct. 1, 2009 in U.S. Appl. No. 11/663,253.
Response dated Jan. 21, 2010 in U.S. Appl. No. 11/663,253.
Notice of Allowance dated May 3, 2010 in U.S. Appl. No. 11/663,253.
Office Action dated Sep. 14, 2009 in U.S. Appl. No. 11/392,050.
Response dated Dec. 14, 2009 in U.S. Appl. No. 11/392,050.
Notice of Allowance dated Apr. 15, 2010 in U.S. Appl. No. 11/392,050.
Response dated Oct. 14, 2009 in U.S. Appl. No. 10/591,074.
Office Action dated Dec. 28, 2009 in U.S. Appl. No. 10/591,074.

Response dated Dec. 11, 2009 in U.S. Appl. No. 11/908,169.
Office Action dated May 14, 2010 in U.S. Appl. No. 11/908,169.
Notice of Allowance dated Dec. 7, 2009 in U.S. Appl. No. 10/614,268.
Response dated Jan. 5, 2010 in U.S. Appl. No. 10/614,268.
Notice of Allowance dated May 24, 2010 in U.S. Appl. No. 10/614,268.
Office Action dated Nov. 12, 2009 in U.S. Appl. No. 10/614,532.
Response dated Feb. 11, 2010 in U.S. Appl. No. 10/614,532.
Office Action dated Mar. 26, 2010 in U.S. Appl. No. 10/614,532.
Response dated Jul. 20, 2010 in U.S. Appl. No. 10/614,532.
Response dated Aug. 4, 2009 in related U.S. Appl. No. 11/928,063.
Office Action dated Jul. 15, 2009 in related U.S. Appl. No. 11/908,169.
Office Action dated Jul. 23, 2009 in related U.S. Appl. No. 11/928,007.
Response dated Jul. 21, 2009 in related U.S. Appl. No. 11/663,253.
Partial International Search report in related Application No. PCT/US2008/056358.
U.S. Appl. No. 11/928,037, filed Oct. 30, 2007, McFadden.
Office Action dated Oct. 3, 2008 in related U.S. Appl. No. 10/591,074.
Office Action dated Aug. 19, 2008 in related U.S. Appl. No. 11/663,253.
Office Action dated May 30, 2007 in related U.S. Appl. No. 10/614,268.
Response dated Nov. 30, 2007 in related U.S. Appl. No. 10/614,268.
Office Action dated Feb. 4, 2008 in related U.S. Appl. No. 10/614,268.
Response dated Aug. 4, 2008 in related U.S. Appl. No. 10/614,268.
Office Action dated Aug. 13, 2007 in related U.S. Appl. No. 10/576,847.
Response dated Feb. 12, 2008 in related U.S. Appl. No. 10/576,847.
Office Action dated Apr. 24, 2008 in related U.S. Appl. No. 10/576,847.
Response dated Oct. 7, 2008 in related U.S. Appl. No. 10/576,847.
Office Action dated Sep. 4, 2007 in related U.S. Appl. No. 11/392,050.
Response dated Mar. 6, 2008 in related U.S. Appl. No. 11/392,050.
Office Action dated Jul. 22, 2008 in related U.S. Appl. No. 11/392,050.
Office Action dated Jan. 25, 2005 in related U.S. Appl. No. 10/614,532.
Response dated Jun. 27, 2005 in related U.S. Appl. No. 10/614,532.
Office Action dated Sep. 22, 2005 in related U.S. Appl. No. 10/614,532.
Response dated Mar. 22, 2006 in related U.S. Appl. No. 10/614,532.
Office Action dated Apr. 7, 2006 in related U.S. Appl. No. 10/614,532.
Response dated Oct. 10, 2006 in related U.S. Appl. No. 10/614,532.
Office Action dated Jan. 11, 2007 in related U.S. Appl. No. 10/614,532.
Response dated Jul. 11, 2007 in related U.S. Appl. No. 10/614,532.
Office Action dated Sep. 27, 2007 in related U.S. Appl. No. 10/614,532.
Response dated Mar. 27, 2008 in related U.S. Appl. No. 10/614,532.
Office Action dated Jul. 23, 2008 in related U.S. Appl. No. 10/614,532.
EP03759175 Supplemental European Search Report mailed Jun. 10, 2010.
EP03759175 Office Action dated Nov. 4, 2010.
PCT/US2008/056358 Partial International Search Report dated Jul. 15, 2008.
U.S. Appl. No. 10/614,268 Response dated Jan. 5, 2010.
U.S. Appl. No. 10/614,532 Response dated Feb. 11, 2010.
U.S. Appl. No. 11/908,169 Final Office Action dated Nov. 29, 2010.
U.S. Appl. No. 10/614,532 Response dated Jan. 13, 2011.
U.S. Appl. No. 10/614,532 Office Acton dated Feb. 2, 2011.
U.S. Appl. No. 11/663,253 Response dated Nov. 18, 2008.
U.S. Appl. No. 11/663,253 Supplemental Response dated Dec. 11, 2008.
U.S. Appl. No. 11/663,253 Request for Continued Examination filed Jul. 15, 2010.
U.S. Appl. No. 11/908,169 Response dated Sep. 14, 2010.
U.S. Appl. No. 10/614,532 Final Office Action dated Oct. 13, 2010.
Notice of Allowance dated Apr. 1, 2011 in U.S. Appl. No. 11/663,253.
Office Action dated Jun. 8, 2011 in U.S. Appl. No. 11/908,169.

* cited by examiner

COMBINATION SPEED COOKING OVEN

CROSS REFERENCE TO RELATED APPLICATIONS

The present application claims priority to International Application No. PCT/US2005/035605 filed 5 Oct. 2005; claims priority to U.S. application Ser. No. 11/098,280 filed 4 Apr. 2005; claims priority to International Application No. PCT/US2006/009075 filed 14 Mar. 2006 and claims priority to U.S. application Ser. No. 11/392,050 filed 29 Mar. 2006. Upon entry into the National Stage in the United States of America, the present application will be a continuation-in-part of U.S. application Ser. No. 11/098,280 filed 4 Apr. 2005; will be a continuation-in-part of U.S. application Ser. No. 10/614,268 filed 7 Jul. 2003; will be a continuation-in-part of U.S. application Ser. No. 10/614,532 filed 7 Jul. 2003; and will be a continuation-in-part of U.S. application Ser. No. 11/392,050 filed 29 Mar. 2006.

The present application contains technical disclosure in common with International Application No. PCT/US2003/021225 filed 5 Jul. 2003; contains technical disclosure in common with International Application No. PCT/US2005/007261 filed 7 Mar. 2005; contains technical disclosure in common with U.S. Provisional Application No. 60/394,216 filed 5 Jul. 2002; contains technical disclosure in common with PCT/US2004/035252 filed 21 Oct. 2004; contains technical disclosure in common with International Application No. PCT/US2005/035605 filed 5 Oct. 2005, contains technical disclosure in common with International Application No. PCT/US2006/009075 filed 14 Mar. 2006, contains technical disclosure in common with U.S. Provisional Application No. 60/513,110 filed 21 Oct. 2003; contains technical disclosure in common with U.S. Provisional Application No. 60/513,111 filed 23 Oct. 2003; contains technical disclosure in common with U.S. Provisional Application No. 60/614,877 filed 30 Sep. 2004; contains technical disclosure in common with U.S. Provisional Application No. 60/551,268 filed 8 Mar. 2004; contains technical disclosure in common with U.S. Provisional Application No. 60/615,888 filed 5 Oct. 2004; and contains technical disclosure in common with U.S. Provisional Application No. 60/550,578 filed 5 Mar. 2004.

All of the applications set forth above are incorporated herein by reference as if fully set forth.

FIELD OF THE INVENTION

The present invention relates to a re-circulating oven which is particularly useful in combining a speed cooking zone and a separate low/medium speed cooking zone within a single cooking cavity.

DESCRIPTION OF RELATED ART

Speed cooking of food products in a speed cooking oven is a very desirable method of cooking. Conventional cooking (slower and medium speed cooking) may also be desirable. Historically, in order to speed cook, a speed cook oven was required. In the event the operator desired, for whatever reason, to cook conventionally, the operator would have been required to utilize a conventional cooking oven. In many instances the requirement of two appliances was not desirable.

SUMMARY OF THE INVENTION

This invention relates to ovens for cooking of food products. In particular, this invention combines the ability to cook at high speed, or alternatively, to cook at a separate slower speed within a single cooking cavity. Current technology does not allow the operator to cook at high speed or slower speed within a common cavity but rather, the high speed and the low to medium speed cooking approaches have been developed as separate appliances where the operator has either a high speed oven or a low to medium speed oven, but not both in the same appliance. Benefits of a combination speed oven include significant cost reduction associated with a common cook cavity (e.g., sharing of: cooking cavity, microwave system, convection blower unit, and other components); significant installation and kitchen space savings because a single oven replaces separate high speed and low to medium speed cooking appliances; and the ability to incorporate a high speed cooking oven into a traditional free standing range or slide-in oven while maintaining multi-rack baking capabilities and options.

Additional objects, features and advantages of the present invention will become readily apparent from the following detailed description of the exemplary embodiment thereof, when taken in conjunction with the drawings wherein like reference numerals refer to corresponding parts in the several views.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

An exemplary version of the combination speed cooking oven is shown as a stand alone cooking appliance, but this stand alone combination speed cooking appliance may exist in many other commercial, industrial, vending and residential embodiments (e.g. counter-top oven, wall-oven, single rack oven, multi-rack oven), because the combination speed cooking oven with gas flow control is scalable up or scalable down.

As used herein the term "combination speed cook oven" refers to an oven capable of cooking at various speed combinations, either conventional, accelerated or speed cooking. The term "scalable" means that additional larger or smaller embodiments may be developed and the invention is not limited to a certain size or particular design. Of course each embodiment may have different size characteristics and require different voltages of electricity—as commercial power supplies are generally different than residential power supplies. The combination speed cook oven is therefore not limited to commercial uses only, and is equally applicable for residential (home) use, vending and industrial uses. As used herein, the term "commercial" includes, but is not limited to, the commercial food service industry, restaurants, fast food establishments, quick service restaurants, convenience stores (to list a few) and other mass feeding establishments and the term "residential" refers, generally speaking, to residential applications (home use), although the term is not limited to residences only, but refers to non-commercial applications for the speed cooking oven. The terms "flow control means" "gas deflecting means" "transfer deflection mechanism" and "flow control means" all have the same meaning and refer to means to control gas flow within the oven. The term "mixing" refers to the glancing, conflicting and colliding gas flow patterns that meet upon and above the top surface, and upon and below the bottom surface of a food product and upon and above the side surfaces of the food product. The terms "mix", "mixing", "turbulent mix" and "turbulent mixing" have the same meaning herein and refers to the glancing, conflicting and colliding gas flow patterns that meet at and upon the top and bottom surfaces and the side surfaces of a food product, thereby producing high heat transfer and speed cooking of the food product due to spatial averaging of the gas flow heat transfer. The terms "conventional cooking" and "conventional means", have the same meaning and refer to cooking at the quality level and at the speed that is currently widely utilized. The term "cooking by-products" refers to smoke, grease, vapors, small aerodynamic grease particles, odors, and other products caused by the cooking process and the term "odor filter" does not refer exclusively to filtering of odors, but instead refers generally to filtering, reduction of, removal of or catalytic destruction of by-products of the cooking process. The term "gas" refers to any fluid mixture, including air, nitrogen and other mixtures that may be used for cooking and applicant intends to encompass within the language any gas or gas mixture existing or developed in the future that performs the same function.

The term "rapid cooking" "rapid cook", "speed cooking" and "speed cook" have the same meaning and refer to cooking at five to ten times faster, and in some instances more than 10 times faster than conventional cooking. The term "accelerated cooking" has the meaning of cooking at speeds faster than conventional cooking but not as fast as speed cooking.

With reference to FIGS. 1-5, appliance 101 includes an oven cavity 102 generally defined by a top wall 103, a bottom wall 104, left side wall 105, right side wall 106, a back wall 194, and a front wall 195. Oven cavity 102 also has associated therewith access opening 107 through which food items 110 may be placed within oven cavity 102 upon cooking racks 108 a-d, FIGS. 3-4. Although shown as a countertop oven with one speed cooking rack 108a, FIG. 3 supported by lower gas discharge plates 127a, 127b, to be discussed further herein, and conventional, accelerated and in some instances speed cooking racks 108b, 108c and 108d, FIG. 4, the invention may be practiced wherein more than one speed cooking rack, and fewer or more than three conventional and accelerated cooking racks may be utilized. Additionally, rack 108a may be a free-standing cooking rack not supported by the gas discharge plates. Cooking appliance 101 has a hinged door 109 pivotally attached to the oven front for closing the cooking section opening 107 during cooking operation. Hinged door 109 may be swung between an open position wherein the door allows access to oven cavity 102 and a closed position wherein the door covers the opening into oven cavity 102. Although illustrated as a hinged door pivotally attached at the bottom of the front of the oven, the door may be hinged on the right side, left side or top side.

Figure 5:
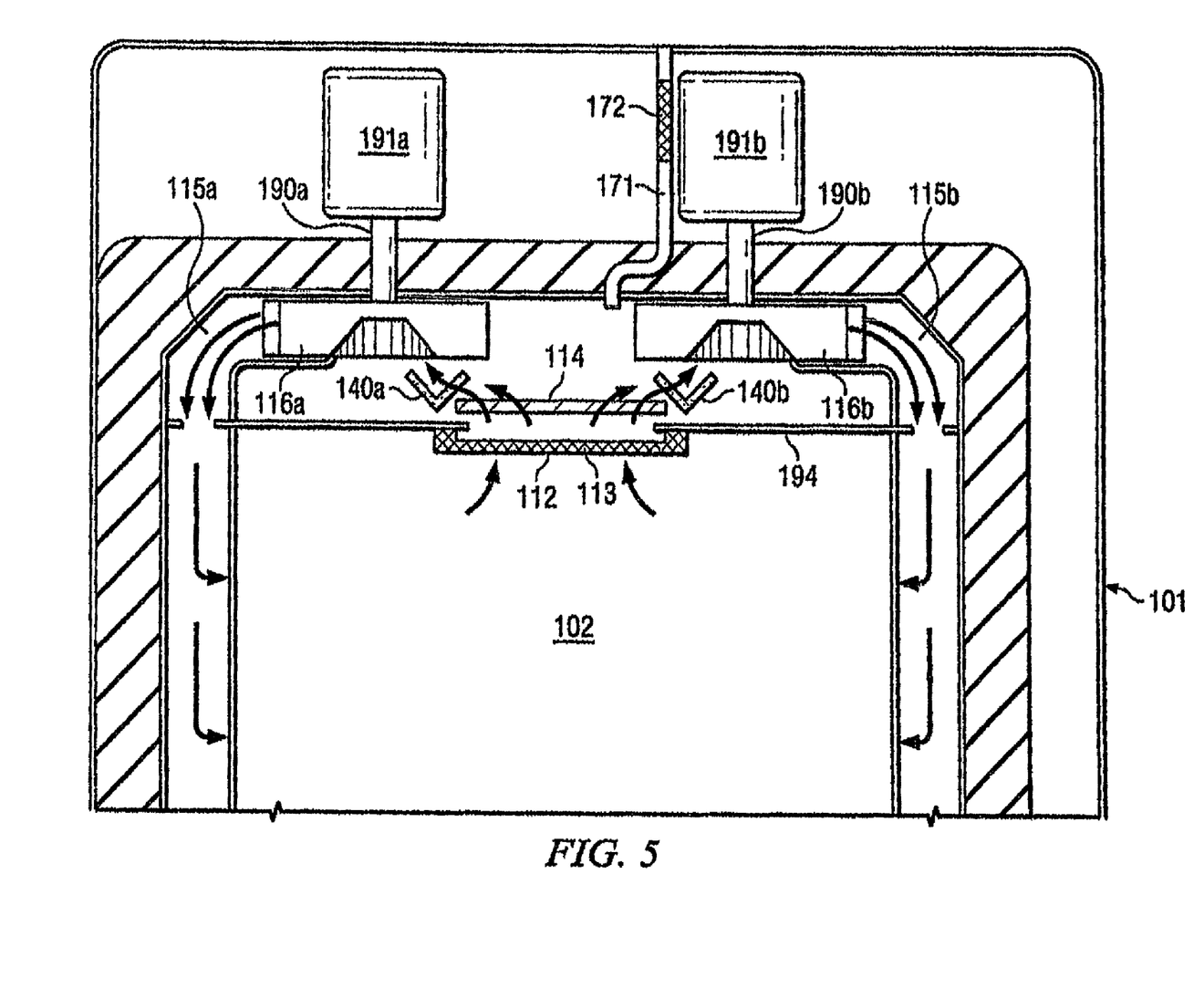
FIG. 5 is a top view of the oven.

Referring now to FIG. 5, the combination speed cooking oven is comprised of two independent gas transfer systems, described herein as a left gas transfer system and a right gas transfer system wherein left gas transfer system delivers gas to and from the left side of the oven cavity 102, and right gas transfer system delivers gas to and from the right side of the oven cavity 102. Although each gas transfer system is described separately and as identical, there is no requirement they be identical and indeed in some instances may vary one from another The gas transfer systems operate and serve to distribute gas to the respective sides of oven cavity 102. Oven cavity 102 also has associated therewith vent tube 171, FIG. 5, which allows for the passage of vent gas from oven cavity 102 to atmosphere. Affixed within vent tube 171 may be odor filter 172, which provides for the removal of odors caused by the cooking process. Various materials may be utilized for odor filter 172 and varying materials with varying efficiencies may be utilized. For example, in some instances it may be desirable for odor filter 172 to completely filter all odors, while at other times it may be desirable to provide for a less efficient odor filter 172 in order to allow for the passage of some cooking odors.

Figure 1:
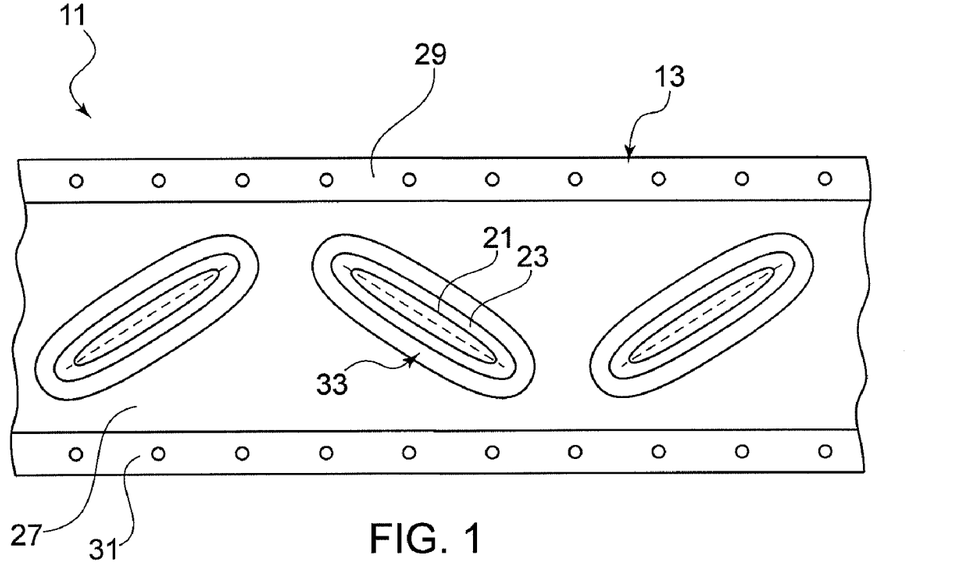
FIG. 1 is a front view of the oven illustrating a single speed cooking rack design.
Figure 2:
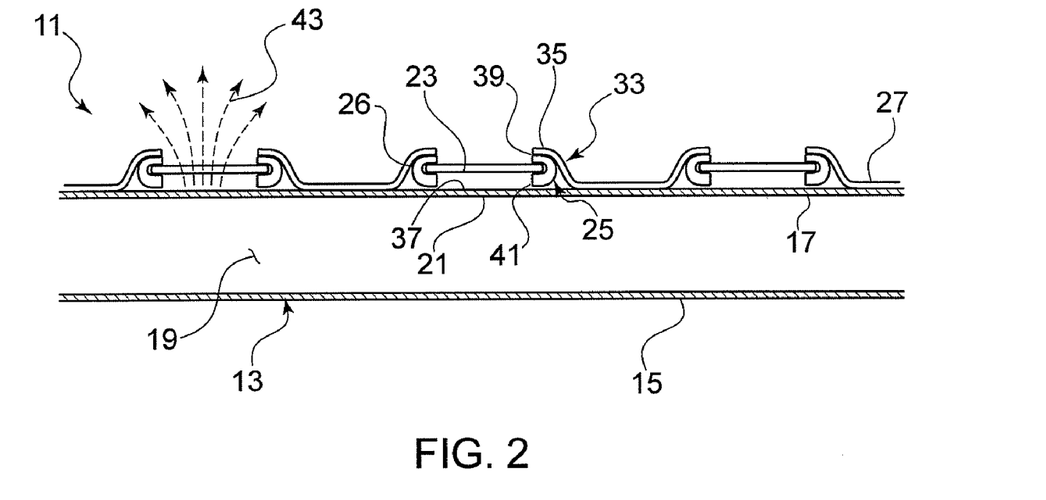
FIG. 2 is a side view of the oven.

Gas is transferred to the left side of oven cavity 102 via a left gas transfer system, which is comprised of a left gas transfer section 115a, extending from blower wheel 116a, FIG. 5 through back wall 194 and into gas transfer section 117a, FIG. 1. In fluid connection with left gas transfer section 115a is gas egress opening 112, FIGS. 3-4, which is open to, and in fluid connection with oven cavity 102 through back wall 194. Gas egress opening 112 is substantially rectangular, although other geometries may be utilized, and is located within oven back wall 194 providing for the passage of gas from oven cavity 102 into left gas transfer section 115a, as gases are removed from oven cavity 102. Although described as a back wall gas egress system, there is no requirement that gas egress opening 112 be located within the back wall and other locations may be utilized. Located within or adjacent to back gas egress opening 112 may be grease extractor 113, FIG. 5. As gas is drawn through gas egress opening 112 the gas passes across grease extractor 113, which removes the larger grease particles. By extracting the larger grease particles managing grease build-up in the down stream conduits and heater area is simplified. It may be desirable to utilize grease extractor 113, or alternatively no grease extractor, or still further additional grease extractors may be placed throughout the gas flow path. Gas then passes over heating means 114, FIG. 5.

Figure 3:
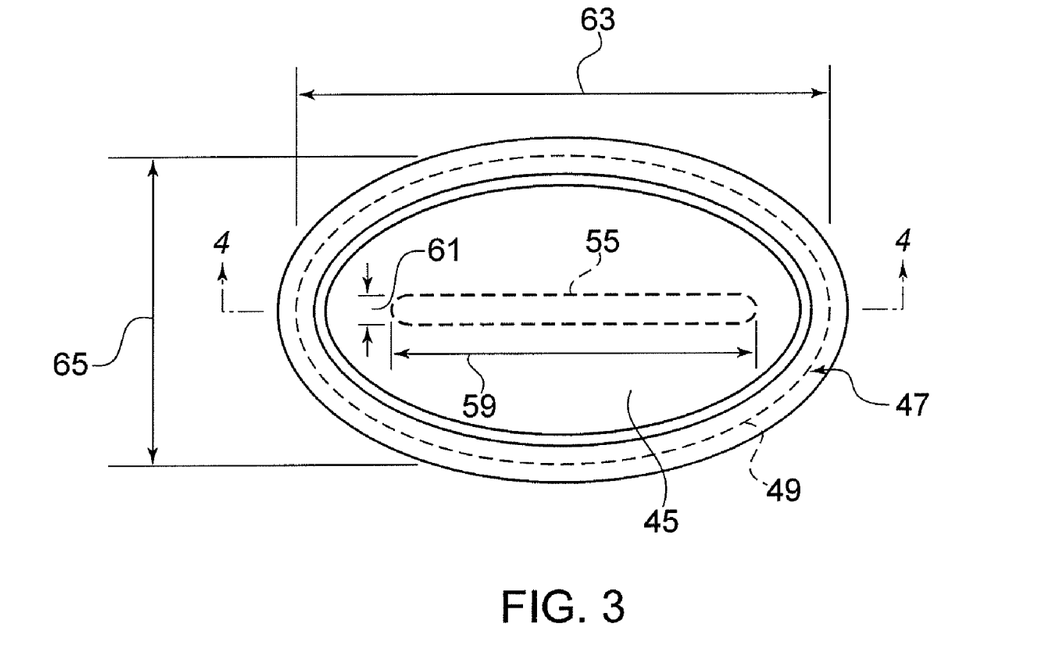
FIG. 3 is a front view of the oven illustrating gas flow.

Heating means 114 may include a direct fired thermal energy source, indirect fired thermal energy, propane, natural gas, electric resistance heating elements, and other thermal means, and applicant intends to encompass within the language any structure presently existing or developed in the future that performs the same function. In fluid connection with, and located within left gas transfer section 115a is a left gas accelerator, illustrated as left blower wheel 116a, FIG. 5. Connected to left blower wheel 116a is blower motor shaft 190a, which is driven by a direct shaft from electric motor 191a. Other means may be employed for coupling blower wheel 116a to electric motor 191a, such as belt drive, and the means is not limited to direct drive. Blower wheel 116a takes gas from oven cavity 102 and delivers the gas via gas transfer section 115a to the left side of oven cavity 102. Although illustrated as a conventional blower motor, blower motor shaft and blower wheel, other gas pumping means such as a compressor may be utilized to re-circulate gas to and from oven cavity 102 and applicant intends to encompass within the language any structure presently existing or developed in the future that performs the same function. Gas transfer section 117a, FIG. 3 is in fluid connection with a lower left gas transfer section 118a via a left vertical gas transfer section 119a. Left vertical transfer section 119a is bounded by left side wall 105, FIG. 3 on one side and a left microwave waveguide section 120a, upper gas discharge plate 123a and lower gas discharge plate 127a. Pivotally affixed within left gas transfer section 117a is gas deflecting means 152a shown in the open position, FIG. 3, and in the closed position FIG. 4.

The exemplary embodiment provides for either speed cooking on one rack, 108a or provides for conventional, accelerated, and in some instances speed cooking on multiple racks 108b, 108c and 108d. The cooking speed is determined by the position of gas deflecting means 152a, and 152b to be discussed further herein. With deflecting means 152a and 152b are in the open position, FIG. 3, speed cooking is accomplished on rack 108a via impingement gas from above the food product and conflicting and colliding gas flow from below the food product, as illustrated by gas flow arrows 133a, 133b, FIG. 3. With 152a and 152b in the closed position, FIG. 4, conventional, accelerated and in some instances speed cooking may be accomplished on racks 108 b-d wherein gas flow is directed toward the food product from the left and right sides of the oven cavity. This gas flow may be: (i) laminar flow from the left side to the right side, (ii) laminar flow from the right side to the left side, (iii) laminar flow from the right side returning to the back wall in the center of racks 108 b-d, or (iv) laminar flow from the left side returning to the back wall in the center of racks 108 b-d,(v) or in some instances may be conflicting and colliding gas flow both left and right sides wherein the gas flows meet and collide upon the food product or upon and above the top surface of the food product and upon and below the bottom surface of the food product. In all instances, the food product may be placed within a cooking vessel or alternatively placed directly upon the cooking rack(s) and in either instance, gas flow strikes either the cooking vessel surface, or the food product surface, and as used herein the term "food product surface" includes the vessel surfaces or the food product surfaces and in some instances both. An example of both is where a food product is covered from the top with a material such as wax paper. In such an instance although the gas flow may not actually touch the food product, heat transfer is transmitted through the wax paper surface.

With gas deflecting means 152a is in the open position, FIG. 3, speed cooking may be performed on single rack 108a. Gas is discharged into left gas transfer section 117a, and directed both upwards into top discharge section 198, FIG. 3 and downwards to lower gas transfer section 118a via gas transfer section 119a. Gas flowing up to section 198 is discharged through apertures 200 of perforated discharge plate 400 and enters oven cavity 102 from above, striking food product 110 from above. Apertures 200 may be slotted, regularly formed or irregularly formed and are illustrated herein as nozzles, 200, 100c, 100d, 101e, 100f, 129a and 129b, to be discussed further herein, and applicant intends to encompass within the language any structure presently existing or developed in the future that performs the same function. Further, means such as normally open, normally closed, or normally partially open and normally partially closed switched plates may be used to limit the size of the apertures, and applicant intends to encompass any structure presently existing or developed in the future that performs the function of limiting gas flow through apertures through previously described apertures. Gas striking food product 110 strikes as gas impingement and is delivered onto the top surface and top side surfaces of food product 110.

Gas that has not been discharged or deflected into top gas delivery section 198 flows to lower left gas transfer section 118a via vertical transfer section 119a. Some cooking operations may require more or less gas flow to the lower part of the food product, while other cooking operations may call for no gas flow to the bottom side of the oven for delivery to the bottom and bottom side surfaces of the food product. In those instances where little or no gas flow is desired upon the bottom surface of the food product, pivotally attached gas transfer deflection mechanism 128a, FIG. 3 may be closed or partially closed in order to allow less gas flow through lower apertures 129a and thereby onto the lower surface of food product 110. Although gas deflection mechanism 128a is shown and illustrated as pivotally attached to gas discharge plate 127a, gas defection may be accomplished in many ways such as attachment of deflection means 128a to the bottom of waveguide 120a, FIG. 4, to the top of waveguide 120a or in multiple other ways in order to accomplish limiting gas flow to lower section 118a and applicant intends to encompass any means that serve to limit the gas flow to lower section 118a.

Figure 4:
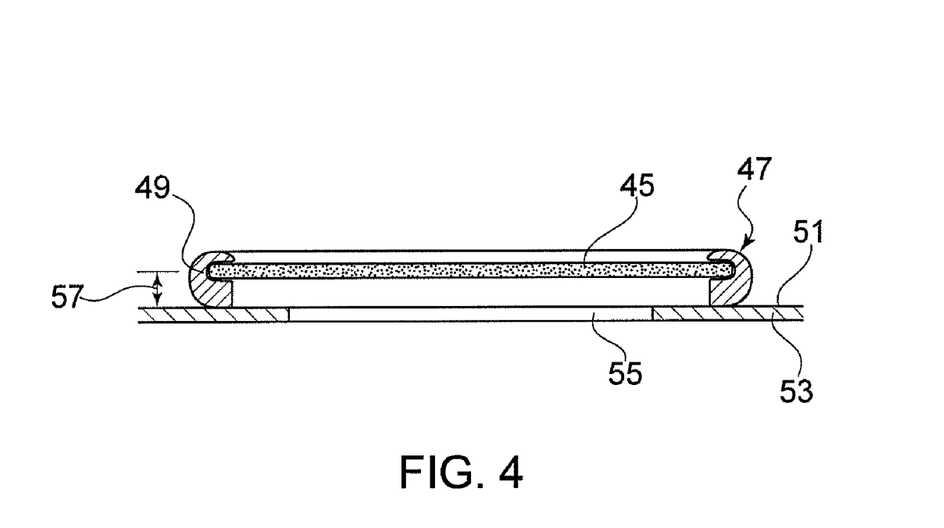
FIG. 4 is a front view illustrating gas flow of a multi rack oven.

Gas that flows to lower left gas delivery section 118a may be re-heated, if required, by lower left heating means 126a, FIG. 4. Apertures 100c, 100d, 100e, 100f, 129a and 129b, and 200 are sized for low pressure drop, while providing and maintaining sufficient gas velocities of approximately 2000 ft/minute to approximately 7000 ft/minute to properly cook the food product, although velocities above 7000 ft/minute may be used and velocities less than 2000 ft/minute may also be utilized. As shown in FIG. 3, the apertures are adjusted such that the majority of the gas is supplied from top gas discharge section 400. The resulting imbalance of gas flows between the top gas flow and lower left gas flow is desirable because the top flow must aggressively remove moisture produced and escaping from the top surface, and top side surface of food product 110. The imbalance also serves to heat, brown and/or heat and brown the food product 110.

Gas is transferred to and from the right side of oven cavity 102 via a right gas transfer system, which is comprised of a right gas transfer section 116b, extending from blower wheel 116b to back wall 194. In fluid connection with right gas transfer section 115b is previously described gas egress opening 112, which is open to, and in fluid connection with oven cavity 102 through back wall 194. In fluid connection with, and located within right gas transfer section 116b is a right gas accelerator, illustrated as right blower wheel 116b, shaft 190b and motor 191b that act in the same manner as previously described left side components 116a, 190a, and 191a. Gas transfer section 117b is in fluid connection with a lower right gas transfer section 118b via a right vertical gas transfer section 119b. Right vertical transfer section 119b is bounded by right side wall 106 on one side and a right microwave waveguide section 120b, upper gas discharge plate 123b and lower gas discharge plate 127b. Pivotally affixed within right gas transfer section 117b is gas deflecting means 152b shown in the open position, FIG. 3, and in the closed position FIG. 4. Although gas deflection means 152a and 152b are shown and illustrated as pivotally attached, other means exist to direct gas flow and applicant intends to encompass any means known or developed that accomplishes gas flow deflection of 152a, 152b.

Gas is discharged into right gas transfer section 117b, and directed both upwards into top discharge section 198 and through slotted or perforated plate 103; and downwards to lower gas transfer section 118b via gas transfer section 119b. As with the left side, previously described, gas that is discharged through apertures 200 strikes food product 110 from above as gas impingement and is delivered onto the top surface and top side surfaces of food product 110.

Gas that has not been discharged or deflected into top gas delivery section 198 flows to lower right gas transfer section 118b via vertical transfer section 119b and flows to lower right gas delivery section 118b where it may be re-heated, if desired, by lower right heating means 126b, FIG. 4. Lower right gas delivery section 118b may contain gas deflection means 128b. As gas deflecting means 128b is rotated, directional control of the gas flow may be further refined, allowing for gas flow to pass through an upper row or a lower row of apertures (when multiple rows are utilized) of lower gas plate 127b. As with previously described 128a, gas deflecting means 128b is shown as pivotally attached to right slotted or perforated gas discharge plate 127b, but gas deflecting means 128b is not limited to the pivotally attached means illustrated herein, and as described elsewhere herein, applicant intends to encompass within the language any structure presently existing or developed in the future that performs the same function. As shown in FIG. 3, the apertures are adjusted such that the majority of the gas is supplied from top right gas discharge section 103 as with the left side.

Lower left gas flow, 133a, FIG. 3, is directed toward the center of oven cavity 102 from the left side below the food product, and lower right gas flow 133b is directed toward the center of oven cavity 102 from the right side of the oven cavity below the food product. Gas flows 133a, 133b meet and collide upon the bottom and the bottom side surface and below the surface and the sides of the food product and turbulently mix and collide, causing high heat transfer and rapid cooking of the food product from the sides and from below the food product. This turbulently mixed gas flow directed at the food product can best be described as glancing, conflicting and colliding gas flow patterns that spatially average the gas flow over the surface area of the food product producing high heat transfer and moisture removal rates at the food surface, thereby optimizing speed cooking.

As with the left side gas system, in those instances wherein additional directional control of the gas flow is desired, gas deflecting means 128b, FIG. 3 may be rotated such that gas flow is diverted to selected apertures, thereby effecting a different gas flow pattern and gas mixing upon and below the food product surface. Additionally, in those instances wherein no bottom or side gas flow is desired, gas deflecting means 128a, 128b may be closed, thereby allowing for little or no passage of gas flow to the lower portion of the oven cavity and onto the food product. Many and numerous other adjustments of gas deflecting means 128a and 128b are possible and applicant intends to encompass within the language any structure presently existing or developed in the future that allows for combinations of open and closed positions by the various gas flow control means. Gas deflecting (flow control) means 128a, 128b, 152a and 152b may be manually controlled, automatically controlled via controller 134, or some combination of automatic and manual control and applicant intends to encompass within the language any structure presently existing or developed in the future that performs the function described herein concerning adjustment of the gas deflecting means.

In those instances wherein gas deflecting means 152a, 152b are in the closed position, FIG. 4, gas is allowed to flow from sections 115a, 115b into sections 117a, 117b and through apertures 100c-f for conventional, accelerated and in some instances speed cooking on racks 108b, 108c, 108d.

Gas that has not been discharged or deflected through gas discharge plates 123a, 123b may flow to lower gas transfer sections 118a, 118b via vertical transfer sections 119a, 119b. Alternatively, previously described gas flow control means 128a, 128b may be closed, thereby preventing, or restricting the passage of gas to lower gas transfer sections 118a, 118b.

In those instances wherein gas flow is allowed to pass to sections 118a, 118b and through apertures 129a, 129b such gas flow may be re-heated, if desired, by lower heating means 126a, 126b FIG. 4. As gas deflecting means 128a, 128b are rotated, directional control of the gas flow may be further refined, allowing for gas flow to pass through an upper row or a lower row of apertures (when multiple rows are utilized) of lower gas plates 127a, 127b. Again, although gas deflecting means 128a, 128b are shown as pivotally attached to slotted or perforated gas discharge plates 127a, 127b, gas deflecting means 128a, 128b are not limited to the pivotally attached means illustrated herein, and as described elsewhere herein, applicant intends to encompass within the language any structure presently existing or developed in the future that performs the same function. As with apertures 129a, 129b, and 200, apertures 100 c-f are sized for low pressure drop, while providing and maintaining sufficient gas velocities of approximately 2000 ft/minute to approximately 7000 ft/minute to properly cook the food product, although velocities above 7000 ft/minute may be used and velocities less than 2000 ft/minute may also be utilized.

Gas flow above the food product on each rack 108b-d is illustrated as left side 133c, and right side 133d gas flow, FIG. 4. Gas flow below the food product is illustrated as left flow 133e, and right gas flow 133f, directed toward the center of oven cavity 102 from below cooking racks 108b-d within oven cavity 102. The gas flows meet upon the surface of the food product, or just above and below the top and bottom surfaces and sides of the food product and turbulently mix, conflict and collide, causing high heat transfer and rapid cooking of the food product from below and also from the sides as with speed cooking on one rack, as previously described. As with previously described speed cooking, this turbulently mixed gas flow can best be described as glancing, conflicting and colliding gas flow patterns that spatially average the gas flow over the surface area of the food product producing high heat transfer and moisture removal rates at the food surfaces, thereby optimizing cooking.

The velocity of gas flows 133c-f, FIG. 4 determines the particular type of method of cooking. For example, high velocity gas flow may produce the described conflicting and colliding gas flow. Low velocity gas flow produces a smooth or laminar flow across the top and bottom of the food product prior to the gas flow exiting back gas egress opening 112. In some instances it may be desirable to locate multiple gas egress openings 112 at various positions in order to accomplish particular types of cooking, as described further herein.

In those instances wherein directional control through lower gas plates 127a, 127b is desired, gas deflecting means 128a and 128b, FIG. 3 may be rotated such that gas flow is diverted to selected apertures, thereby further effecting a different gas flow pattern and gas mixing upon and below the food product surfaces.

Still further, it may be desirable that combinations of apertures 100c-f, 200, and 129a, 129b be open or closed. In such instances previously described methods of limiting or closing select apertures may be utilized. For example, top apertures 100c, 100d of rack 108d may be open, closed or partially closed thereby affecting top and top side browning or cooking of food product on rack 108d. At the same time, apertures 100c and 100d of cooking rack 108c may be fully open, thereby allowing for different or varying browning or cooking of the top and top surface of the food product upon cooking rack 108c and still further. Various combinations of open, closed or partially open and partially closed apertures exist for apertures 100c, 100d, 100e, 100f and 129a, 129b wherein the various food products upon racks 108 a-d may each be cooked differently depending upon the requirements of the food products themselves (different food products on each rack) or upon the particular desires of the consumer. For example rack 108c may have a bakery product with very little browning, rack 108*d* the same type of food product with more browning and rack 108*d* the same type of food product with much more browning. Additionally, varying aperture size in conjunction with velocity of the gas flow produces varying cooking and browning of a food product and many combinations of aperture size and gas flow velocity exist that allow for varying cooking within the same cooking cavity.

In addition to the ability to cook the same food product differently upon multiple cooking racks, at the same time, there also exists the ability to cook different food products upon the different racks because each rack is capable of the previously described individual rack cooking. For example, a fish filet may be cooked upon rack 108*b*, a beef steak upon rack 108*c* and a rack of lamb upon rack 108*d*. Of course the length of time each product is to be cooked will be, or may be different (i.e., the fish may be removed before the beef and the beef before the lamb, or various other combinations). Alternatively, aperture sizing and velocity control may allow for all food products to remain in the oven until the longest time length food product is finished. Many and various combinations and possibilities therefore exist for cooking multiple food products simultaneously.

The gas flows within the oven, as well as other functions of cooking appliance are directed by controller 134, FIG. 1. Controller 134 determines, among other things, the velocity of gas flow, which may be constant or varied, or, may be constantly changed throughout the cooking cycle. It may be desired to cook the food product on one velocity throughout the entire cooking cycle, or to vary the gas velocity depending upon conditions such as a pre-determined cooking algorithm, or vary the velocity in response to various sensors that may be placed within the oven cavity, oven return air paths or various other positions within the oven. The location and placement of said sensors will be determined by the particular application of the oven. Additionally, other means may be utilized wherein data is transmitted back to controller 134, and thereafter controller 134 adjusts the cooking in an appropriate manner. For example sensors (temperature, humidity, velocity, vision and airborne chemical mixture level sensors) may be utilized to constantly monitor the cooking conditions and adjust the gas flow accordingly within a cooking cycle, and other sensors not described herein may also be utilized. The speed cooking oven may utilize sensors that are not currently commercially utilized (such as laser, non-invasive temperature sensors and other sensors that are currently too expensive to be commercially feasible), and the speed cooking oven is not limited to those discussed herein, as many sensing devices are known and utilized in the cooking art.

The gas flow performance may also be adjusted as a function of available power. In the event, for example, the heating system in an all electric speed cooking oven is requiring or utilizing a large amount of power (larger than available power levels which may vary according to location and local code and ordinance) it may be desirable for the controller to reduce electrical power to the convection heaters or other electrical components accordingly in order to conserve available power. Indeed, in certain parts of the world where power is limited or capped, for example Japan and Italy, the oven of the present invention can be designed to adjust to these limiting conditions. In a speed cooking gas fired unit, some systems will be powered by electric current, but the electric power requirements will not be as high as required for an all electric oven because the energy required for gas heating and cooking will be provided by the combustion of a hydrocarbon based fuel. In this event a controller may not be required, indeed knobs or dials may be utilized.

Managing the gas flow pattern in a speed cooking oven is important relative to controlling the local convection heat transfer rate at the food product. Many food products cooked in a typical rapid cook oven require that the energy into the food (whether the energy be microwave, impingement gas, halogen light or other energy) be "tailored" (distributed) over the entire cooking cycle. This tailoring or modulation of both the microwave and the convection energy systems is an important feature in achieving a rapidly cooked food product with high food quality. For example, a food product such as a pizza may require as much as 30 minutes to cook in a conventional oven, but can be cooked in as little as 3 minutes in a speed cooking oven. During this three minute cooking cycle, the controller may be programmed with an overall routine of cooking instructions that is broken down into sub-routines or events. As such, in a cooking profile, several different "sub-routines" may be utilized to attain the final rapidly cooked food product. The cook cycle may, for example begin with 20 seconds of high velocity gas flow wherein the gas flow is delivered at 100% velocity and the microwave output is 10% of total microwave capacity. This cycle may then, for example, be followed with 10 seconds of cooking time wherein 10% gas flow is utilized and no microwave power is used. This may then be followed by 1 minute wherein 100% gas flow and 100% microwave power is used, followed by, for example, one minute wherein 50% microwave power is used and 50% gas flow is utilized. These speed cooking ovens therefore require a sophisticated control mechanism that is expensive and can be a source of reliability problems and variable speed blowers have therefore been used in order to control, for example, vertical impingement air flow and as previously described, this approach is expensive because dynamically braking speed variable blower motor speed controllers are required, adding complexity and cost to the appliance. In addition, using air flow rates that vary from low flows to high flows requires "over-design" of oven components such as convection heaters, grease control systems, blowers, blower motor controllers and nozzle plates because the parts must work equally well together at low flow conditions as well as at high flow conditions.

Although the present invention may utilize variable speed blower motors and variable speed blower motor controllers, there is no requirement for their use and the speed cooking oven of the present invention avoids these problems, and the complexity of the variable speed blower motors, by maintaining a substantially constant gas glow rate through the oven cavity, gas transfer and gas delivery sections. One means to achieve gas flow pattern modification is by use of a gas pumping means, in this illustration, a blower motor, blower wheel combination, utilizing a controller or a multi speed switch that allows for the switching of the blower motor speed in pre-determined fixed increments. Heating of the convection gas is provided by either electric resistance heating means 114*a* and 114*b* or by a direct fired (product of combustion mix with oven gas) means. The heater is configured such that it can be operated at a lower heat flux for the convection heating and cooking mode, or at a higher rate for radiant heating and cooking. The radiant heating will also provide convection heat for cooking. The purpose of the radiant feature is to provide additional surface browning.

The oven of the present invention may also utilize microwave energy to at least partially cook the food product. As seen in FIG. 1, left side microwave launching waveguide 120*a* is attached within oven cavity 102 to left side wall 105 between top left gas transfer section 117*a* and lower left gas transfer section 118*a*. Right side microwave launching waveguide 120*b* is attached within oven cavity 102 to right side wall 106 between top right gas transfer section 117*b* and lower right gas transfer section 118*b*. The microwave waveguides are designed to distribute microwave power uniformly from the back to the front of oven cook cavity 102. As shown in FIG. 7, such a configuration promotes uniform illumination of microwave energy to the right side and the left side of the cook chamber because the microwave energy from the side walls is additive over the product. Waveguides 120*a-b* direct microwave energy into food product 110 upon cooking rack 108*a*. In some cooking applications wherein cooking is to occur upon racks 108*b-d*, waveguides 120*a-b* may be rotated or pivoted upward to direct microwave energy toward the top portion of oven cavity 102. Three or four narrow apertures (slots) 170*a*, 170*b*, 170*c*, 170*d* may be spaced along the waveguide. Various configurations for microwave distribution have been utilized with varying results and the invention is not limited to a microwave launcher with three or four slots. Indeed only one slot may be utilized. Food product 110 is placed within oven cavity 102 a distance from right and left side waveguides 120*a*, 120 *b* to allow for even distribution of electromagnetic energy into food product 110.

Although the right side waveguide system is described herein as identical to the left side system there is no requirement they be identical and indeed in some instances it may be desired they be different one from another. Microwave energy is broadcast from right waveguide 120*b* into oven cavity 102 via a slotted antenna as previously described for the left side. The microwave energy field therefore propagates through the oven cavity in an evenly distributed pattern, coupling with the food product from all directions, and providing an even electromagnetic energy distribution throughout the oven cavity without the need for a mechanical stirrer to propagate the electromagnetic field. Waveguides 120*a* and 120*b* are located on the left and right side walls of the oven, and therefore do not interfere with oven cavity spent gas exhaust and because the microwave waveguides are located on the side walls of the oven cavity, they are not affected by food spills, grease contamination, cleaning fluid contamination or other contamination that normally affect a bottom launch microwave system. The microwave system of the present invention will therefore be less likely to be penetrated by grease, spills, cleaning materials and other contaminants because the systems are not located directly under the food product where hot contaminants will drip. Although described as on the right and left sides, waveguides 120*a*, 120*b* may be located elsewhere in order to distribute energy to various portions of oven cavity 102. Indeed, in instances wherein food product is placed upon upper racks 108*b-d*, and waveguides 120*a-b* are directed upwards, speed cooking may be accomplished on multiple racks.

To summarize, the present invention provides for a combination speed cooking oven utilizing hot gas flows, and hot gas flows coupled with microwave energy and provides for the control of the gas flows to various parts of the oven in order to achieve speed cooking of food products on a single lower rack or conventional and accelerated cooking on multiple racks. This is accomplished through diverting gas flow within the oven to achieve the desired speed of cooking.

Alternatively and within one cooking cavity the combination speed oven may be utilized for conventional, accelerated or speed cooking on multiple racks.

Although the present invention has been described in considerable detail with reference to certain preferred versions thereof, in this instance gas flow control, other versions are possible. For example, various sizes of commercial and residential speed cooking ovens may be made. In these cases larger or smaller component parts may be utilized and fewer or more components may be employed. In the case where it is desirable to make a smaller speed cooking oven, one gas flow acceleration means may be utilized instead of two; one microwave system utilized instead of two; smaller or fewer thermal devices, whether electric resistance or gas fired may be used. In cases wherein it is desirable for a larger speed cooking oven, multiple rack units may be developed and additional gas flow systems and microwave systems may be added to accomplish a larger cavity, multi rack speed cooking oven.

Also, various sizes of commercial and residential speed cooking ovens may be made and the invention is not limited to the embodiments described herein.

Any element in a claim that does not explicitly state "means for" performing a specific function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. § 112, Other modifications and improvements thereon will become readily apparent to those skilled in the art. Accordingly, the spirit and scope of the present invention is to be considered broadly and limited only by the appended claims, and not by the foregoing specification.

What is claimed is:

1. A convection oven, comprising:
   a housing defining a cooking chamber;
   conduit means associated with the cooking chamber, the conduit means providing for circulation of gas to and from the cooking chamber;
   flow means for causing the gas to circulate;
   heating means for heating the gas;
   at least first and second gas directing means communicating the conduit means and the cooking chamber and configured for directing a flow of circulating gas flowing therethrough;
   a movable baffle selectively movable between a closed position, in which the first gas directing means is at least partially closed, and an open position, in which the first gas directing means is fully open; and
   microwave cooking means in communication with the cooking chamber.

2. A convection oven, comprising:
   a housing defining a cooking chamber;
   conduit means associated with the cooking chamber, the conduit means providing for circulation of gas to and from the cooking chamber;
   flow means for causing the gas to circulate;
   heating means for heating the gas;
   at least first and second gas directing means communicating the conduit means and the cooking chamber and configured for directing a flow of circulating gas flowing therethrough;
   a movable baffle selectively movable between a closed position, in which the first gas directing means is at least partially closed, and an open position, in which the first gas directing means is fully open; and
   wherein the second gas directing means directs at least some of the circulating gas passing therethrough in a generally vertical downward direction, the second gas directing means being adapted for causing flows of circulating gas to impinge on a food product located within the cooking chamber.

3. A convection oven, comprising:
a housing defining a cooking chamber;
conduit means associated with the cooking chamber, the conduit means providing for circulation of gas to and from the cooking chamber;
flow means for causing the gas to circulate;
heating means for heating the gas;
at least first and second gas directing means communicating the conduit means and the cooking chamber and configured for directing a flow of circulating gas flowing therethrough;
a movable baffle selectively movable between a closed position, in which the first gas directing means is at least partially closed, and an open position, in which the first gas directing means is fully open;
a food support located within the cooking chamber and adapted for supporting a food product; and
a third gas directing means located below the food support.

4. The oven according to claim 3, further comprising:
a movable baffle selectively movable between a closed position, in which the third gas directing means is at least partially closed, and an open position, in which the third gas directing means is fully open.

5. A convection oven, comprising:
a housing defining a cooking chamber;
conduit means associated with the cooking chamber, the conduit means providing for circulation of gas to and from the cooking chamber;
flow means for causing the gas to circulate;
heating means for heating the gas;
at least first and second gas directing means communicating the conduit means and the cooking chamber and configured for directing a flow of circulating gas flowing therethrough;
a movable baffle selectively movable between a closed position, in which the first gas directing means is at least partially closed, and an open position, in which the first gas directing means is fully open;
at least one temperature sensor in communication with the cooking chamber and configured to output a signal indicating a sensed temperature; and
a controller configured for automatically controlling the baffle in response to the sensed temperature.

6. A convection oven, comprising:
a housing defining a cooking chamber;
conduit means associated with the cooking chamber, the conduit means providing for circulation of gas to and from the cooking chamber;
flow means for causing the gas to circulate;
heating means for heating the gas;
at least first and second gas directing means communicating the conduit means and the cooking chamber and configured for directing a flow of circulating gas flowing therethrough;
a movable baffle selectively movable between a closed position, in which the first gas directing means is at least partially closed, and an open position, in which the first gas directing means is fully open;
at least one gas flow velocity sensor in communication with the cooking chamber and configured to output a signal indicating a flow velocity; and
a controller configured for automatically controlling the baffle in response to the sensed flow velocity.

7. A convection oven, comprising:
a housing defining a cooking chamber;
conduit means associated with the cooking chamber, the conduit means providing for circulation of gas to and from the cooking chamber;
flow means for causing the gas to circulate;
heating means for heating the gas;
a food support located within the cooking chamber and adapted for supporting a food product;
a first gas directing means communicating the conduit means and the cooking chamber and configured for directing a flow of circulating gas flowing therethrough, the first gas directing means being located on a side of the cooking chamber;
a second gas directing means communicating the conduit means and the cooking chamber and configured for directing a flow of circulating gas flowing therethrough, the second gas directing means being located above the food support;
a movable baffle selectively movable between a closed position, in which the first gas directing means is at least partially closed, and an open position, in which the first gas directing means is fully open; and
microwave cooking means in communication with the cooking chamber.

8. A convection oven, comprising:
a housing defining a cooking chamber;
conduit means associated with the cooking chamber, the conduit means providing for circulation of gas to and from the cooking chamber;
flow means for causing the gas to circulate:
heating means for heating the gas;
a food support located within the cooking chamber and adapted for supporting a food product:
a first gas directing means communicating the conduit means and the cooking chamber and configured for directing a flow of circulating gas flowing therethrough, the first gas directing means being located on a side of the cooking chamber;
a second gas directing means communicating the conduit means and the cooking chamber and configured for directing a flow of circulating gas flowing therethrough, the second gas directing means being located above the food support:
a movable baffle selectively movable between a closed position, in which the first gas directing means is at least partially closed, and an open position, in which the first gas directing means is fully open; and
a third gas directing means located below the food support.

9. The oven according to claim 8, further comprising:
a movable baffle selectively movable between a closed position, in which the third gas directing means is at least partially closed, and an open position, in which the third gas directing means is fully open.

10. A convection oven, comprising:
a housing defining a cooking chamber;
conduit means associated with the cooking chamber, the conduit means providing for circulation of gas to and from the cooking chamber;
flow means for causing the gas to circulate;
heating means for heating the gas;
a food support located within the cooking chamber and adapted for supporting a food product;
a first gas directing means communicating the conduit means and the cooking chamber and configured for directing a flow of circulating gas flowing therethrough, the first gas directing means being located on a side of the cooking chamber;

a second gas directing means communicating the conduit means and the cooking chamber and configured for directing a flow of circulating gas flowing therethrough, the second gas directing means being located above the food support;

a movable baffle selectively movable between a closed position, in which the first gas directing means is at least partially closed, and an open position, in which the first gas directing means is fully open;

at least one temperature sensor in communication with the cooking chamber and configured to output a signal indicating a sensed temperature; and a controller configured for automatically controlling the baffle in response to the sensed temperature.

11. A convection oven, comprising:

a housing defining a cooking chamber;

conduit means associated with the cooking chamber, the conduit means providing for circulation of gas to and from the cooking chamber;

flow means for causing the gas to circulate;

heating means for heating the gas;

a food support located within the cooking chamber and adapted for supporting a food product;

a first gas directing means communicating the conduit means and the cooking chamber and configured for directing a flow of circulating gas flowing therethrough, the first as directing means being located on a side of the cooking chamber;

a second gas directing means communicating the conduit means and the cooking chamber and configured for directing a flow of circulating gas flowing therethrough, the second gas directing means being located above the food support;

a movable baffle selectively movable between a closed position, in which the first gas directing means is at least partially closed, and an open position, in which the first gas directing means is fully open;

at least one gas flow velocity sensor in communication with the cooking chamber and configured to output a signal indicating a flow velocity; and a controller configured for automatically controlling the baffle in response to the sensed flow velocity.

* * * * *